(12) United States Patent
Jobert et al.

(10) Patent No.: US 9,143,251 B2
(45) Date of Patent: Sep. 22, 2015

(54) PHASE SYNCHRONIZING NODES IN A TELECOMMUNICATIONS NETWORK

(75) Inventors: Sebastien Jobert, Begard (FR); Fabrice Deletre, Lannion (FR); Yves Morlon, Lannion (FR)

(73) Assignee: Orange, Paris (FR)

(\*) Notice: Subject to any disclaimer, the term of this patent is extended or adjusted under 35 U.S.C. 154(b) by 820 days.

(21) Appl. No.: 12/601,089

(22) PCT Filed: May 20, 2008

(86) PCT No.: PCT/FR2008/050875
§ 371 (c)(1),
(2), (4) Date: Nov. 20, 2009

(87) PCT Pub. No.: WO2008/149028
PCT Pub. Date: Dec. 11, 2008

(65) Prior Publication Data
US 2010/0182980 A1    Jul. 22, 2010

(30) Foreign Application Priority Data
May 22, 2007    (FR) ...................................... 07 55203

(51) Int. Cl.
*H04J 3/02* (2006.01)
*H04J 3/06* (2006.01)
*H04L 7/06* (2006.01)

(52) U.S. Cl.
CPC .............. *H04J 3/0667* (2013.01); *H04J 3/067* (2013.01); *H04L 7/06* (2013.01)

(58) Field of Classification Search
CPC ..................................................... H04J 3/0667
USPC ......... 370/336, 324, 350, 503, 509, 511, 514, 370/520
See application file for complete search history.

(56) References Cited

U.S. PATENT DOCUMENTS

| | | | |
|---|---|---|---|
| 5,559,796 A | 9/1996 | Edem et al. | |
| 6,476,847 B2 * | 11/2002 | Satoh et al. | 347/252 |
| 6,633,590 B1 * | 10/2003 | Garofalo et al. | 370/507 |
| 2002/0018475 A1 | 2/2002 | Ofek et al. | |
| 2003/0235216 A1 | 12/2003 | Gustin | |
| 2008/0212618 A1 | 9/2008 | Morlon et al. | |
| 2009/0002230 A1 * | 1/2009 | Kee et al. | 342/357.12 |

FOREIGN PATENT DOCUMENTS

WO    0188746    11/2001

OTHER PUBLICATIONS

Series 1: Integrated Services Digital Network, Overall network aspects and functions—protocol layer requirements; B-ISDN ATM Adaptation Layer specification: Type 1AAL, ITU-T Recommendation I.363.1, Aug. 1996.

\* cited by examiner

*Primary Examiner* — Donald Mills
*Assistant Examiner* — Henry Baron
(74) *Attorney, Agent, or Firm* — Knobbe Martens Olson & Bear LLP (57) ABSTRACT

For phase synchronizing nodes, on a node by node basis, following a tree-structured phase distribution network using the infrastructure of a telecommunications network, a first node transfers to a second node phase information substantially in phase with a phase reference internal to the first node and position signaling of the phase information with respect to component elements, such as bits, of a data signal carried by a link linking the nodes. The position signaling can be the number of component elements separating it from the phase information in a packet. The time to transfer the phase information through the link is precisely compensated.

19 Claims, 5 Drawing Sheets

PHASE SYNCHRONIZING NODES IN A TELECOMMUNICATIONS NETWORK

RELATED APPLICATIONS

The present application is based on, and claims priority from, FR Application Number 0755203, filed May 22, 2007, and PCT Application Number PCT/FR08/050872, filed May 20, 2008, the disclosures of which are hereby incorporated by reference herein in their entireties.

The present invention relates to a method for phase synchronizing nodes in a telecommunications network to impose a common phase to nodes.

Some applications, in particular in a cellular telecommunications network of the UMTS ("Universal Mobile Telecommunications System") type, or in a digital video broadcast network of the DVB-T terrestrial ("Digital Video Broadcast Terrestrial") type or for receiving on DVB-H mobiles ("Digital Video Broadcasting-Handheld"), or in a telecommunications network with a WIMAX access ("World wide Interoperability Microwave Access"), need a phase synchronization, with a precision of one microsecond order, which is a quite significant constraint. Otherwise stated, equipments in neighboring nodes of a network require a common phase reference, with a maximum error of one microsecond order. The phase synchronization is justified for multiple reasons such as the time division multiplexing, a reduction of the intercellular handover time, a reduction of interferences between network equipments, an optimization of the radio interface performance and a battery power saving in mobiles.

Conventionally, telecommunications networks provide a frequency synchronization giving the equipments in need thereof a reference rhythm without being a priori in phase.

It is however possible to use a time synchronization for phase synchronizing equipments, but with a low precision of one millisecond order. For example, the NTP time synchronization protocol ("Network Time Protocol") is used for synchronizing clocks of computers between a customer and a server based on averaging time intervals between reception times for predetermined stamped packets and time stamps extracted from such packets being transmitted from the server to the customer. According to another example, the IEEE 1588 protocol recommends to transmit synchronization and follow-up packets including time stamping data from a master clock to a slave clock so that the latter is being synchronized on the master clock.

For reaching a phase synchronization with a precision to within one microsecond, telecommunications operators deployed positioning system receivers GPS ("Global Positioning System") for connecting them to equipments of a telecommunications network. The receiver is able to provide a pulse per second to the equipment, and each signal delivered by the equipment is in phase to within one microsecond.

However, GPS receivers are expensive and do not use the existing infrastructure of the telecommunications network, which does not allow for a coupling to the frequency synchronization distribution architecture.

For overcoming the above described disadvantages, a method of phase synchronizing nodes linked by links of a telecommunications network, is characterized in that it includes, from a first node to a second node, transferring phase information substantially in phase with a phase reference internal to the first node and a position signaling of the phase information with respect to component elements of a data signal carried by a link of the network linking the first node to the second node.

Transferring a phase information occurs from one node to one node, on step by step basis, link by link, according to a tree-structured distribution network of the phase synchronization. This invention thus provides an alternative solution to GPS receivers by means of transmission links in a telecommunications network to provide a phase synchronization with quality to applications or equipments in the nodes.

With respect to protocol time synchronization solutions of the NTP type, the method of the invention has the advantage that it is not influenced by the traffic in the network and consumes much less pass-band.

Transferring phase information can include in the first node generating phase information substantially in phase with the phase reference internal to the first node, generating the position signaling of the generated phase information with respect to the component elements in the data signal, and transmitting the data signal with the generated phase information and the generated position signaling to the second node, and, in the second node, detecting the generated position signaling and the generated phase information in the data signal, and phase synchronizing a phase reference internal to the second node with the generated phase information in dependence on the generated position signaling of the generated phase information.

The generated position signaling is adapted to the characteristics of the data transmitted in the link. The position signaling can be a number of component element between the generated phase information and a bit having a predetermined rank in a predetermined packet including said number, the bit with a predetermined rank preceding or succeeding to the generated phase information; or a managing code word that is generated with a predetermined phase shift with respect to the phase reference internal to the first node and in which the generated phase information is positioned in a predetermined rank, or still a specific modulation in the generated phase information.

In order to further specify the position of the phase information with respect to the component elements of the data signal and to emit the phase information such as a phase bit more accurately than the granularity of the data signal in the links, the generated and transferred position signaling can be completed by a residual information specifying a time interval between the generated phase information and a time of the phase reference internal to the first node, the time interval being less than a period of the component elements in the data signal. According to another embodiment, instead of specifying a residual information, the first node memorizes a cumulated residual time interval between the generated phase information and the phase reference internal to the first node, and implements a time shift of the generated phase information one component element in the data signal if the memorized cumulated residual time interval exceeds a period of the component elements in the data signal.

For precisely phasing nodes on a step by step basis in the network, this invention further provides compensating a transfer time of the phase information through the link linking the first node to the second node. Compensating the transfer time advantageously avoids a phase time or advance accumulation along the tree-structured phase synchronization distribution network.

More particularly, to dynamically slave the second node on the first node, compensating the transfer time can include the following iterative steps of:

from the first node to the second node, transmitting the phase information in the first node with a time shift, either advance or delay, depending on the transfer time with respect to the phase reference internal to the first node and the position signaling of the phase information to the second node, in the second node, synchronizing a phase reference internal to the second node with receipt of the phase information transmitted by the first node and detected as a function of the position signaling, transmitting from the second node to the first node a phase information substantially in phase with the synchronized phase reference internal to the second node and a position signaling of the phase information with respect to the component elements of a data signal carried by the link linking the first node to the second node, and upon receipt of the phase information in the first node, updating the time shift with respect to the phase reference internal to the first node as a function of the previous time shift and of a phase shift between the phase reference internal to the first node and the transmitted phase information detected as a function of the transmitted position signaling.

In order to progressively phase synchronizing the second node, the phase reference of the second node can be phased progressively by time shifts of the transmission of the phase information generated in the first node depending on fractions of the transfer time with respect to the phase reference internal to the first node.

Similarly, for progressively synchronizing the phase in the second node upon receipt of the first phase information transmitted by the first node, the phase reference of the second node can be phased progressively by subtracting the receipt time of the phase information transmitted by the first node from a time close to an initial phase reference of the second node, dividing the resulting difference by a coefficient more than 1, and phasing the initial phase reference from the quotient of the division with respect to said close time.

Another object of the invention is to provide first and second nodes. A node, as a first node, adapted to phase synchronize another node and linked thereto by a link in a telecommunications network is characterized in that it includes means for transferring to the other node a phase information substantially in phase with a phase reference internal to the first node and a position signaling of the phase information with respect to component elements of a data signal transmitted by the link to the other node. A node, as a second node, adapted to be phase synchronized by another node and linked thereto by a link in a telecommunications network is characterized in that it includes means for phase synchronizing a phase reference with receipt of a phase information substantially in phase with a phase reference transferred by said other node and detected as a function of a position signaling of the phase information with respect to component elements of a data signal transmitted by said other node on the link.

The invention relates to also computer programs adapted to be respectively performed in a node adapted to phase synchronize another node and in a node adapted to be phase synchronized by another node in a telecommunications network according to the invention, to perform the method of the invention, each of said programs including program instructions which, when the program is executed in a processor of the respective node, perform steps according to the method of the invention.

Finally, the invention concerns a data signal adapted to be carried by a link between two nodes of a telecommunications network to be phase synchronized, characterized in that it includes a phase information substantially in phase with a phase reference internal to one of the nodes, and a position signaling of the phase information with respect to component elements of the data signal.

Other characteristics and advantages of the present invention will become more clearly apparent from reading the following description of several embodiments of the invention, given by way of nonlimiting examples, with reference to the corresponding appended drawings in which.

Figure 1:
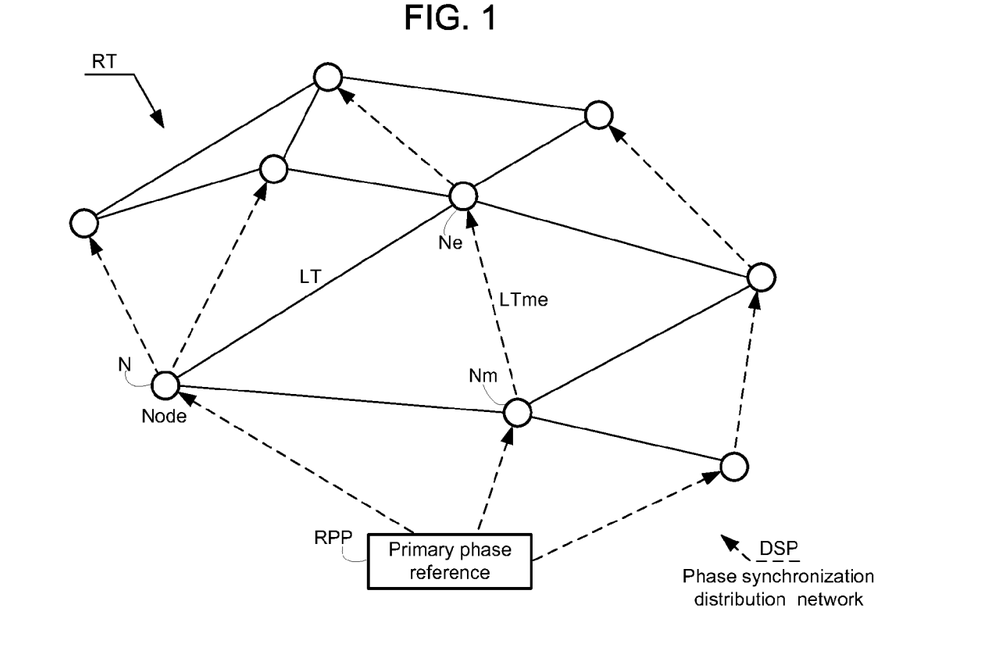
FIG. 1 is a schematic block diagram of a telecommunications network including a phase synchronization distribution network according to this invention.

Referring to FIG. 1, a telecommunications network RT includes transmission links LT and nodes N. A node can be a stationary or mobile terminal or a server, as well as an equipment internal to the network, such as a base station, a controller, a switch or a network head. A link is for example a virtual path for packets or cells on a medium such as a wire or radio link. For example, the network RT is a digital cellular radio communication network for mobiles.

Figure 2:
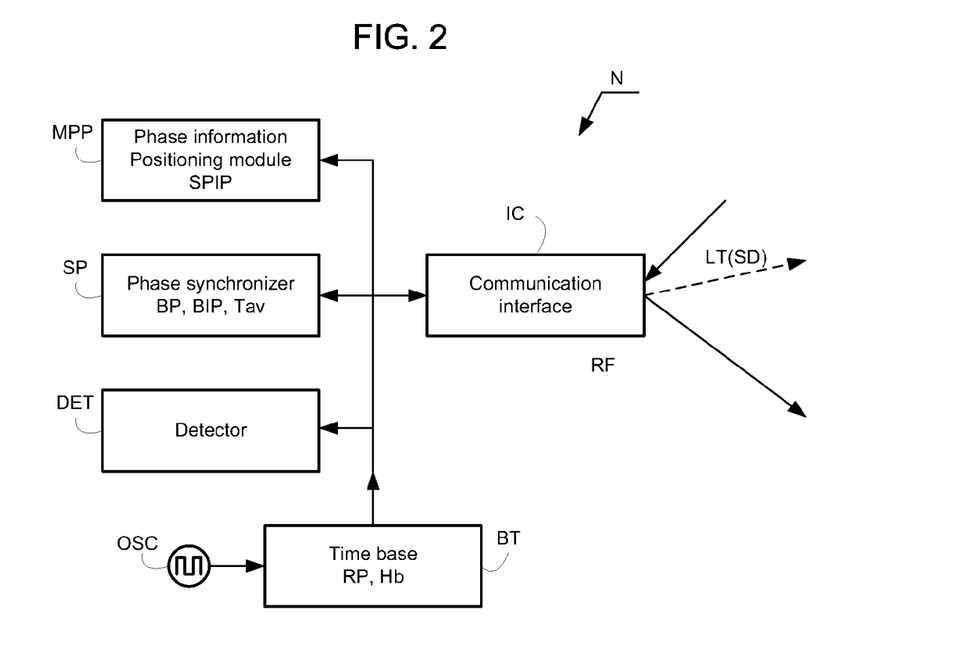
FIG. 2 is a block diagram relating to a network node according to the invention.

As schematically shown in FIG. 2, a node N is only represented by functional blocks, most of which provide functions relating to this invention and can correspond to software modules implemented in one or more processors and/or to material modules. The node N includes a detector DET, a phase synchronizer SP for generating a phase information on a phase reference internal to node N, a phase information positioning module MPP for signaling a phase information position to another node, a time base BT and a communication interface IC servicing transmission links LT in the network RT.

The time base BT is associated with a voltage-controlled oscillator OSC and generates various clock signals necessary to the operation of the functional blocks constituting the node N. In particular, a clock signal Hb defines a clock period Tb corresponding to the rate of a digital data signal SD to be transmitted or received through at least one link LT, to which the node N is linked. Another clock signal Hb defines an internal periodic phase reference RP indicated by a phase information BP to be transmitted to at least another node. For example, the clock period Tb is less than one microsecond, and the phase reference RP is present as a pulse at a period less than one second, typically in the order of one to a few milliseconds.

In the remainder of the description, reference is made to a data signal SD that is binary and whose bits constitute the elements making up the signal SD. It is understood that any known element other than a bit can be considered as making up the digital data signal, such as a digit or a ternary element or, more generally, a symbol with plural states resulting for an emission from the processing of a binary data signal to be transmitted, as a coding and/or a compression and/or a modulation for example. Consequently, the word "element" of a data signal can be substitute for the word "bit" in the remainder of the present description. For example, the clock signal Hb can have the emission frequency of code elements in a data signal transmitted in a Code Division Multiple Access (CDMA) network.

In the remainder of the description, the above mentioned reference marks relative to a node can be followed by a small letter "m" or "e" for indicating an element included or associated with a so-called "master node" Nm or a so-called "slave node" Ne.

In superimposition with the telecommunications network, the invention provides a phase synchronization distribution network DSP that is tree-structured. The phase synchronization distribution network can be superimposed or not to the frequency synchronization distribution network. The tree corresponding to the distribution network DSP in dotted line in FIG. 1 includes a root that is a node containing a primary phase reference RPP and branches extending from the root and each made up of a set of transmission links LT.

As shown in dashed lines in FIG. 1, the phase information is propagated iteratively from link to link from the root to the leaves of the branches in the phase synchronization distribution network DSP. Propagation of the phase synchronization occurs according to an iterative process between each pair of nodes of the network DSP following the direction of the phase synchronization distribution from the root.

In a pair of successive nodes connected directly with no intermediary node, the node of the upstream pair following the phase synchronization distribution direction from the root is a master node Nm and the other downstream node is a slave node Ne. The master node Nm is in charge of diffusing the phase synchronization to the slave node Ne, i.e. of updating a phase reference RPe internal to the slave node Ne on a regular basis. The master node Nm thus acts locally as a phase reference RPm with respect to the slave node Ne, although it derives itself its phase synchronization from another node, except if the master node is the root of the tree making up the primary phase reference RPP. The slave node Ne can act as a master node towards a following node by going up in the tree towards a leaf, for distributing it the phase synchronization it has received. Conversely, by going down in the tree up to the root, the master node can act as a slave node towards a lower node acting as a master node.

This invention presumes that the phase information transfer time between both nodes of a pair, the master node Nm and the slave node Ne, exhibits variations contained within restricted limits and is practically constant and identical in the direction of the link LTme from the master node Nm to the slave node Ne and in the direction of the link LTem from the slave node Ne to the master node Nm. The transfer times are a priori different for considered different pairs of nodes. The links LTme et LTem between the nodes Nm et Ne are considered hereinbelow as having the same physical medium.

The primary phase reference RPP at the root of the tree is a master node and is not a slave node relative to any other node. The primary phase reference can correspond to different types of equipment such as a GPS receiver diffusing a phase in relationship with the universal time clock UTC, or a phase signal local generator provided with a caesium clock with a large stability. The leaves of the tree are slave nodes, but are not master nodes in respect to any other node.

Figure 3:
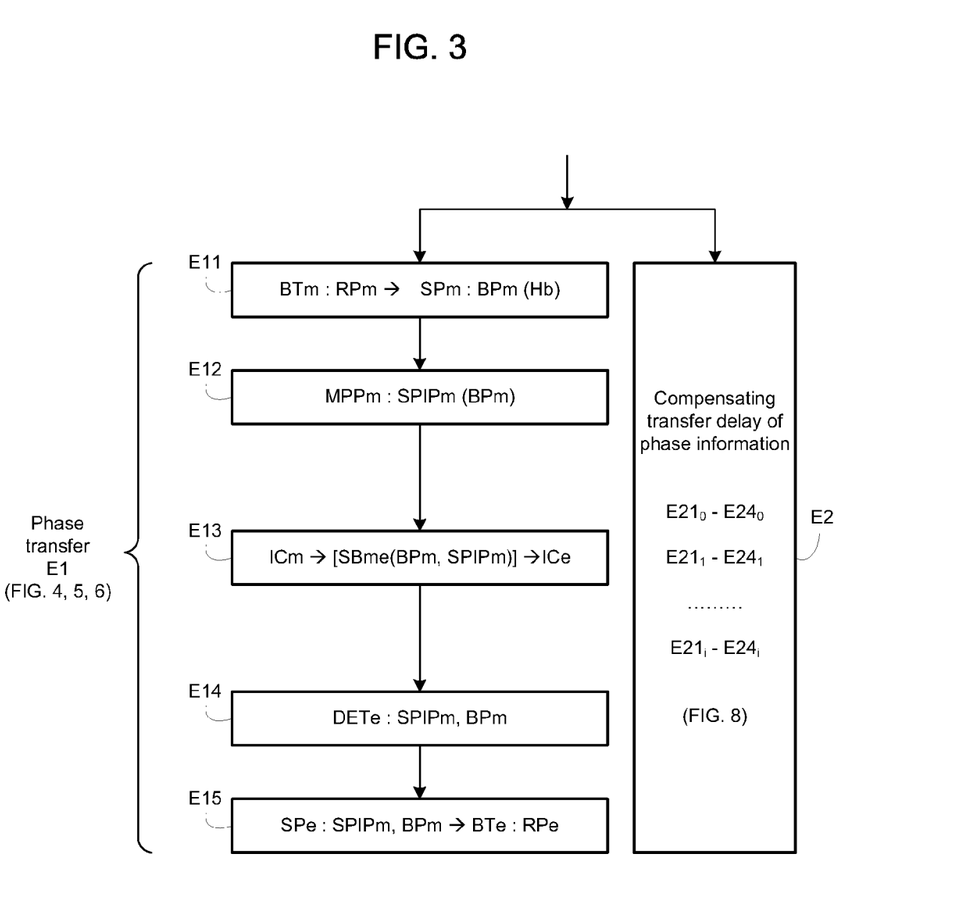
FIG. 3 is an algorithm of the phase synchronizing method according to the invention.

As shown in FIG. 3, the phase synchronizing method according to the invention for a pair of nodes Nm and Ne includes a phase transfer step E1 using a transmission link LT of the network RT linking those two neighboring nodes, and a step E2 for compensating the transfer time of the phase information depending on the propagation in the transmission link LT. The aspects of the phase transfer and the aspects of the transfer time compensation are overlapped one into the other. For this reason, steps E1 and E2 are shown in parallel in FIG. 3 and are described hereinbelow separately for making easier the understanding of the phase synchronizing method of the invention.

The phase transfer step E1 includes steps E11 to E15 also shown in FIG. 3.

In step E11, the phase synchronizer SPm in the master node Nm monitors a clock signal that is provided by the time base BTm and the pulses of which mark the periodicity TRP of a phase reference RPm internal to the master node Nm. The frequency 1/TRP of the phase reference RPm is much less than that 1/Tb of the clock signal Hb corresponding to the rate of the binary data signal SDme to be transmitted on the link LTme towards a slave node Ne or to be received from the slave node Ne through a link LTem.

Counters in the phase synchronizer SPm count the bit periods Tb of the clock signal Hb between two consecutive times of the phase reference RPm and cyclically the phase references RPm so that the synchronizer SPm generates recurrent phase information. The recurrence TMJ with which the phase synchronizer SPm checks the phase information BPm for transmitting it in coordination with the phase reference RPm is specified subsequently upon the description of the transfer time compensating step E2. For example, such a check occurs approximately once per second.

The recurrent phase information is, for example, a phase bit BPm having a determined position in the data signal SD so that the master node Nm transfers such phase information representative of its internal phase reference to the slave node Ne. The phase bit BPm can be specific to the phase information, or can carry useful data information, such as will be shown hereinbelow according to three embodiments.

In step E12 in the master node Nm, the phase information positioning module MPPm generates under the control of the phase synchronizer SPm a signaling SPIPm of the position of each of phase information generated such as the particular bit BPm. Such a position indicates to the slave node Ne the position of the internal phase reference RPm with respect to the bits of signal SD to be emitted on the transmission link LTem, before any processing such as encoding and modulating in the communication interface ICm.

In step E13, the communication interface ICm of the master node Nm introduces according to substantially the same recurrence the phase information BPm and the signaling SPIPm of the position thereof in the data signal SDme to be transmitted in the link LTme towards the slave node Ne.

Upon receipt of the data signal SDme, the communication interface ICe in the slave node Ne processes the data signal SDme so as to apply it to the detector DETe. The detector DETe is adapted to the data structure in the received signal SDme and can detect, for example, bits, words such as bytes, packets or predetermined packet fields, in step E14. In such a case, the detector DETe detects and extracts the position signaling SPIPm and the phase information BPm in the received data signal SDme.

In step E15, the phase synchronizer SPe of the slave node Ne synchronizes in phase in the time base BTe the phase reference RPe internal to the slave node Ne with the phase information BPm recovered by the detector DETe as a function of on the detected position signaling SPIPm.

As already stated, the elements included in a node are sometimes used for the master function and sometimes for the slave function. For example, steps E14 and E15 occur in the node Nm when it is the slave of a master node located upstream in the phase distribution direction from the primary phase reference RPP in the phase synchronization distribution network DSP shown in FIG. 1; and steps E11 and E12 occur in the node Ne when it is the master of a slave node located downstream in the phase distribution direction in the network DSP.

Figure 4:
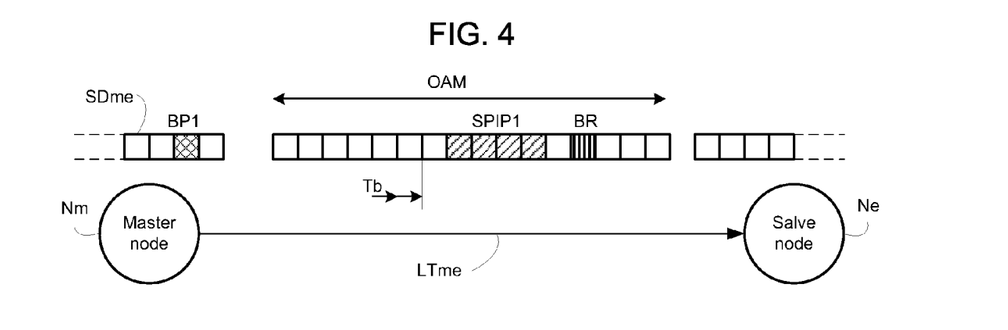
FIGS. 4, 5 and 6 are block diagrams of a phase information transmission link from a master node to a slave node respectively according to the first, second and third embodiments of this invention.

According to a first embodiment shown in FIG. 4 related to a packet telecommunications network RT, for example an Ethernet network GbE, an operation and management packet OAM is used for transmitting the signaling SPIP1 of the position of the phase information BP1 from the master node Nm to the slave node Ne. The packets OAM are specific management packets transmitted on the link LTme in the absence of data transfer. The node Nm guarantees that the packets OAM are transmitted with a given minimum recurrence, the useful data being delayed from time to time, should it be necessary.

The phase information BP1 is a bit included in a data signal packet SDme, such a packet being optionally a packet OAM dedicated, more particularly, to the phase synchronization. The dedicated packet includes a reference bit BR having a predetermined rank in the packet; for example, the reference bit is the last bit of the packet header.

In the first embodiment, it is not required to delay the emission of the management packet OAM so as to transmit the latter "exactly" at the time of the phase reference internal to the master node Nm. Otherwise stated, the reference bit BR having a constant rank in the packet OAM does not necessarily correspond to the phase time at which the phase bit BP1 is to be emitted substantially in phase with the phase reference RPm of the master node Nm. As the bit number in the management packet OAM is relatively high, the position signaling SPIP1 indicating the position of the phase bit BP1 introduced outside or inside the packet OAM under the control of the synchronizer SPm can be coded in the form of a word, such as half a byte or one byte, having a stationary location in the packet OAM. The word SPIP1 specifies the signed number of bit(s) following or preceding the phase bit BP1 and separating the reference bit BR in the packet OAM from the phase bit BP1, such a number of bit(s) being equal to or more than zero. As the phase bit BP1 can precede the reference bit BR or follow the latter, the number of bit(s) separating the bits BR and BP1 can be signed. For example in FIG. 4, the word SPIP1 comprises 4 bits represented by squares with tilted hatches and signals that 15 bits separate the reference bit BR represented by a square with vertical hatches from the phase bit BP1 represented by a square with crossed hatches.

In addition, non only the position signaling of the position information BP1 with respect to a stationary location in the packet OAM is encoded into the word SPIP1, but also a residual information specifying the time interval, the actual advance or delay expressed in period fraction of bit Tb in the data signal SD, between the phase bit BP1 in the signal SDme transmitted to the slave node Ne and the actual time of the internal phase reference RPm of the master node Nm is encoded. Indeed, sometimes, the phase synchronizer SPm selects the phase bit BP1 from the transmitted data signal SDme at a position which does not correspond a priori exactly to the actual time of the internal phase reference in the master node Nm. The residual information on the time interval between the phase bit BP1 and the phase reference RPm increases the granularity of the phase information BP1 transmitted beyond the period Tb of the transmitted data signal, compensating the inaccuracy resulting from the choice of a particular phase bit BP1 for the phase reference time RPm. The residual information also avoids the advance or delay accumulation along the network DSP.

According to one example, a node Nm in a packet network RT transmits a data signal at 1.25 Gbit/s, i.e. a bit period of 800 ps, and 300 management packets OAM per second. A node Ne approximately receives one packet OAM every $1000/300=0.003$ s, i.e. every $3.10^6$ ns. If the phase information BP1 is transmitted one per second, the maximum number of binary transitions on the link LTme between the time of the phase reference RPe and the arrival of the packet OAM the closest to such a time is of the order of $(3000 \cdot 10^6)/800 = 4.10^6$ transitions. The latter value is to be encoded into the packet OAM for avoiding for the transmission of this packet to be delayed.

For a position signaling of the phase information SPIPm coded for example in a 3-byte word offering $16.10^6$ possibilities and by adding 1 byte for encoding the residual value for the time interval between the phase bit BP1 and the phase reference RFm, corresponding to a fraction of bit time Tb according to a split of each bit into 256 sub-intervals, all 4 encoding bytes take less space with respect to the known time synchronization protocol NTP for example requiring 3 8-byte stamps per packet, for packet sizes ranging from 48 to 68 bytes. Moreover, the phase information is only transmitted according to the invention once per second, the remainder of the transmitted packets OAM not carrying such information.

By reducing the byte number used in the information SPIP1 for giving the position of the phase bit BP1, the size of the window in which the packet OAM is to be transmitted is also reduced.

According to the first embodiment, the information SPIP1 and BP1 can be included in a packet OAM carrying a Status Synchronization Message SSM.

Alternatively, instead of transmitting a residual information relating to the time interval between the phase bit BPm and the internal phase reference RPm, the node Nm emitting a phase bit BPm memorizes the value of a cumulated residual time interval, cumulating advances or delays, between the emitted phase bit BPm and the phase reference RPm internal to the node Nm, in order for the phase reference time RPe in the slave node Ne to be exactly phased with the phase reference time RPm. When the memorized cumulated residual time interval exceeds a full clock period Tb of the binary data signal SDme to be transmitted physically in the transmission link LTme, then the phase synchronizer SPm time shifts the phase bit to be transmitted one clock period Tb and thus one bit to the previous bit of the data signal if an advance of the phase bit BPm is to be compensated with respect to the phase reference RPm, or to the following bit of the data signal if a delay of the phase bit BPm is to be compensated with respect to the phase reference RPm. The node Nm emitting the phase bit does not communicate the residual phase error occurring in the node Nm to the node Ne receiving the phase bit, but stores the phase error for compensating it itself from time to time. Such an alternative also avoids the advance or delay accumulation along the phase synchronization distribution network DSP. An advance or delay accumulation can also be avoided by coupling the phase synchronization and the frequency synchronization, as described later.

Figure 5:
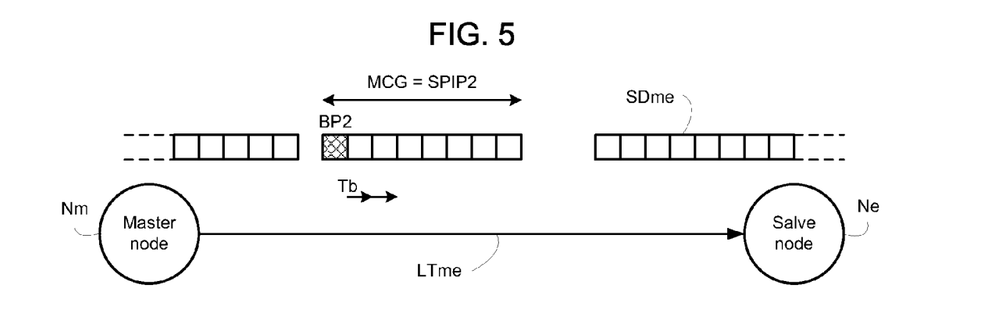

According to a second embodiment shown in FIG. 5 relative to a packet telecommunications network RT, for example an Ethernet network GbE with a data signal SDme at least 1 Gbit/s, short specific management packets, referred to as management code words MCG, are transmitted on the link LTme in the absence of data transfer. Management code words MCG are shorter than management packets OAM. According to the invention, the position signaling SPIP2 indicating the position of the phase information such as a phase bit BP2 is a management code word MCG dedicated to the phase information to be transmitted. The phase bit BP2 is positioned in a predetermined rank, for example, the last one, in the dedicated management code word MCG=SPIP2.

The phase information positioning module MPPm under the control of the phase synchronizer SPm emits the dedicated management code word MCG=SPIP2 so as to delay it with respect to the phase reference RPm internal to the master node Nm, thereby imposing to the emission of the dedicated word a predetermined phase shift with respect to the phase reference RPm internal to the first node. Such a predetermined phase shift is intended to match the phase bit BP2 as a phase mark precisely with the phase reference RPm taking into account the compensation of the transfer time when this is possible, i.e. when no useful data is being transmitted. The phase bit BP2 is thus not emitted all the time, for example, is not emitted every second.

Figure 6:
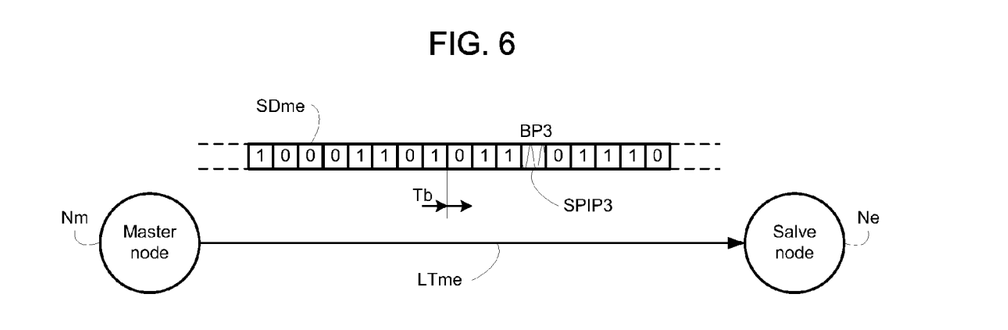

According to a third embodiment shown in FIG. 6, the phase information is a specific phase bit BP3 that is not in any binary states "0" and "1" of bits of the data signal SDme and that contains a specific modulation of a binary signal bit to be transmitted. Such a specific modulation is, as such, the signaling SPIP3 of the position of the phase bit BP3 in the data signal to be transmitted. The phase bit is used for encoding the phase information to distinguish it from the other data bits. The phase synchronizer SPm generates the phase bit at the very time of the phase reference RPm internal to the master node Nm taking into account the compensation of the transfer time when this is possible, i.e. when no useful data is being transmitted. The phase bit BP3 is thus not emitted all the time, for example, is not emitted every second.

According to the invention, it is not indispensable a priori that a transmission link LTme being able to transmit the phase information be frequency synchronized. The link LTme can be a priori asynchronous and, consequently, the oscillators OSCm, OSCe of time bases BTm, BTe in the nodes can have a priori independent frequencies. Clock signals Hb relative to the transmission and the reception on several links LT linked to a node N can be asynchronous. The synchronizer SPm in the master node Nm selects as a phase bit BPm to be transmitted in the link LTme from the master node the closest bit to the internal phase reference RPm of the master node Nm, taking into account the compensation of the transfer time between the master node Nm and the slave node Ne, as will be specified subsequently.

However, coupling the phase synchronizing method according to the invention with a known frequency synchronization improves the performance of the method, in particular between the updating periods of the phase of the slave node Ne. Between two updates of the phase of the slave node Ne, the internal phase reference RPe thereof progresses at the rhythm of its internal oscillator OSCe. If oscillators OSCm and OSCe generate good quality frequencies, which are stable and do not exhibit frequency bias, the phase shift between the phase references RPm and RPe of the master and slave nodes between two updates of the phase reference RPe in the slave node Ne is thus limited. Consequently, coupling between frequency synchronization and phase synchronization allows to carry out less frequent updates of the phase in the slave node Ne, while complying with the desired accuracy of the phase information during the transmission thereof through nodes.

For avoiding any phase advance or delay accumulation along the whole phase synchronization distribution network DSP and thereby refining the granularity of the phase information transmitted beyond the period Tb of the data signal transmitted on the line, the phase synchronizer SP of each node N controls in the time base BT of the node N a substantial modification of the clock period Tb and thus of the rate of the data bits to be transmitted in a link. The substantial modification of the clock period Tb compensates for the time interval, the actual advance or delay, between the time where the phase bit BP should be really transmitted by the node N, as a node Nm, and the transmission times of data bits, and makes the node internal phase reference match exactly on a transmitted data bit. Typically, the adjustment of the clock period Tb in the time base BT is at the most half a period ahead or delayed per transmission period of the phase information BP, i.e. a very low variation of the rate for example at the most once per second. The synchronizer SP refines the granularity of the phase information transmitted beyond the binary period Tb of the data signal transmitted on the link.

Figure 7:
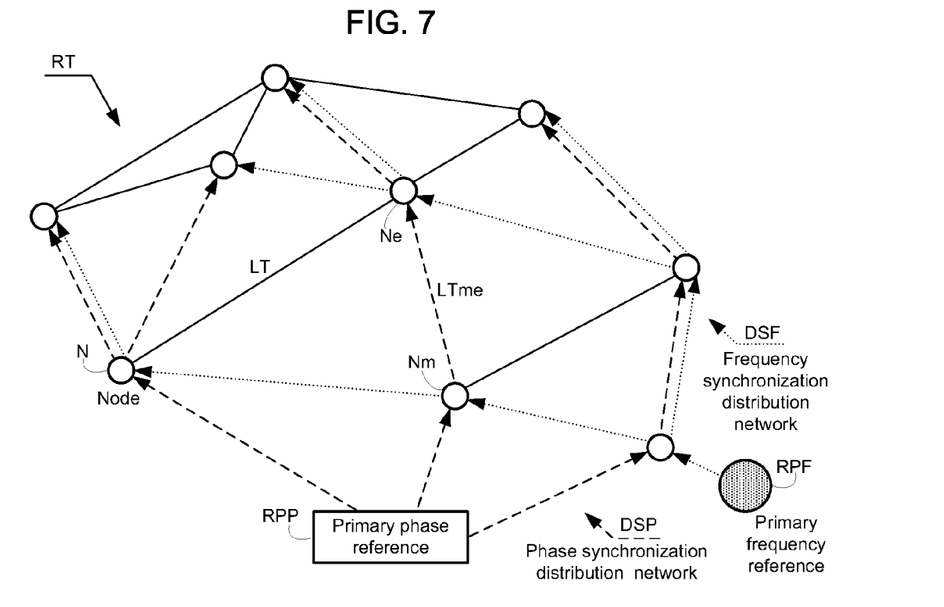
FIG. 7 is a schematic block diagram of the telecommunications network of FIG. 1 also including a frequency synchronization distribution network.

According to an embodiment shown in FIG. 7, the phase synchronization distribution network DSP and a frequency synchronization distribution network DSF use the structure of the telecommunications network RT in parallel. The tree corresponding to the network DSF represented in dashed lines in FIG. 7 includes a root that contains a primary frequency reference RPF and that is a node being able to be distinct from the node containing the primary phase reference RPP, with networks DSP and DSF which are then not superimposable. Alternatively, the primary phase and frequency references RPP and RPF are included into a common node, and/or the networks DSP and DSF are superimposed. When a transmission link LT is used both as a frequency synchronizing link and a phase synchronizing link, the phase synchronizing method is improved. Coupling between networks DSP and DSF advantageously provides the phase synchronization distribution network DSP with defined mechanisms for the frequency synchronization distribution network, adapting them to the requirements of the network DSP.

Some redundancy of the phase synchronization distribution network DSP is achieved while linking a slave node Ne to at least two master nodes Nm synchronizing in phase. In case of a failure of the main master node or of the link linking the slave node Ne to the main master node, the slave node Ne uses the other master node as a spare node for the phase synchronization. Toggling from one master node to another can result in the slave node from the analysis of information transmitted on the quality of the links used for the phase synchronization, as a number of crossed nodes and the quality of transmission of the last crossed link synchronizing in phase, for example included into a synchronization message SSM.

The step E2 compensates for the transfer time of the phase information BP between nodes through the links of the network DSP as receiving such phase information by a slave node Ne is not instantaneous with the emission from a master node Nm. The emission time of the phase information by the master node Nm does not correspond to the reception time of the phase information by the slave node Ne because of the propagation time between nodes. Various parameters influence the propagation time of the phase information, such as the length of the link LTme between nodes Nm and Ne and the temperature of the link environment. The propagation time is predominant in the transfer time and can be considered as equal to the latter.

Compensating for the transfer time at each master node between the root and a leaf of the phase synchronization distribution network DSP solves any phase delay accumulation in the crossed nodes and thus confers a phasing with no bias of such nodes.

For compensating for the transfer time of the phase information, this invention shifts, either in advance or in delay, each emission time of the internal phase information in a master node Nm. A dialog of the "question-respond" type is initiated between the master node Nm and the slave node Ne for determining the transfer time. Each of both nodes is caused, upon such a dialog, to transmit to the other node information SPIPm, SPIPe about the position of its internal phase reference RFm, RFe. The master node Nm is the initiator of such a dialog, and advances the emission of the phase information, such as the phase bit BPm, with respect to its internal phase reference RFm for compensating for the transfer time. Symmetrically, alternatively, the slave node Ne is the initiator of the dialog and is in charge of shifting the emission of the phase information with respect to the internal phase reference thereof.

In the remainder of the description, the propagation time from the master node Nm to the slave node Ne and the propagation time in opposite direction from the slave node Ne to the master node Nm are considered as identical and are designated by TP as they mutually succeed practically one after the other in a short time span. However, the transfer times for different pairs of nodes in the network RT are a priori different.

Because of the dialog between the master node Nm and the slave node Ne, the packets including a phase information and emitted by a node contain an indication, such as a particular bit, indicating the direction of transportation for the phase information, depending whether it is of the master type and originates from a master node following the direction from the root to the leaves of the tree in the network DSP, or is of the slave type and originates from a slave node following the direction of the leaves to the root of the tree in the network DSP. By means of the indication of the direction of the transportation for the phase information giving the origin of the phase information, a node receiving a phase information can decide to slave its internal phase reference if the phase information originates from a master node Nm and does not have to slave it if the phase information originates from a slave node Ne.

For dynamically slaving on a master node Nm, the slave node Ne responds to the master node Nm by transmitting to the latter the phase information BPe relative to its own internal phase reference RFe. The master node Nm then knows it currently has a new slave node Ne slaved on the phase thereof. Dynamically slaving the phase of the slave node on a master node brings some redundancy to the phase synchronization distribution network, allowing a slave node to change master node should the phase received by the slave node become damaged. The phase synchronizing method does not create any direct phase synchronization loop as a master node Nm knows whether one of the neighboring nodes is slaved on its phase reference RFm, as this neighboring node transmits to it an indication of the direction of transportation for the phase information BPe of the slave type or BPm of the master type.

Each node can thus diffuse its phase information as a master node towards the other nodes using it or not for slaving their internal phase reference, except towards its own master node for which said each node diffuses phase information BPe of the slave type.

A master node Nm should maintain updated an advance time Tav for each of its slave nodes Ne. The advance time Tav is the transfer time of the phase information from the master node Nm to the slave node Ne being considered and defines the advance by which the master node Nm shifts the emission time of the phase information constituted by the phase bit BPm, transmitted to the slave node Ne with respect to the internal phase reference RPm of the master node Nm, so that the slave node Ne receives the phase bit BPm in phase with the internal phase reference RFm of the master node. The slave node Ne keeps sending a phase bit BPe according to its internal phase reference RFe to the master node Nm without shifting the emission time of the bit BPe.

Figure 8:
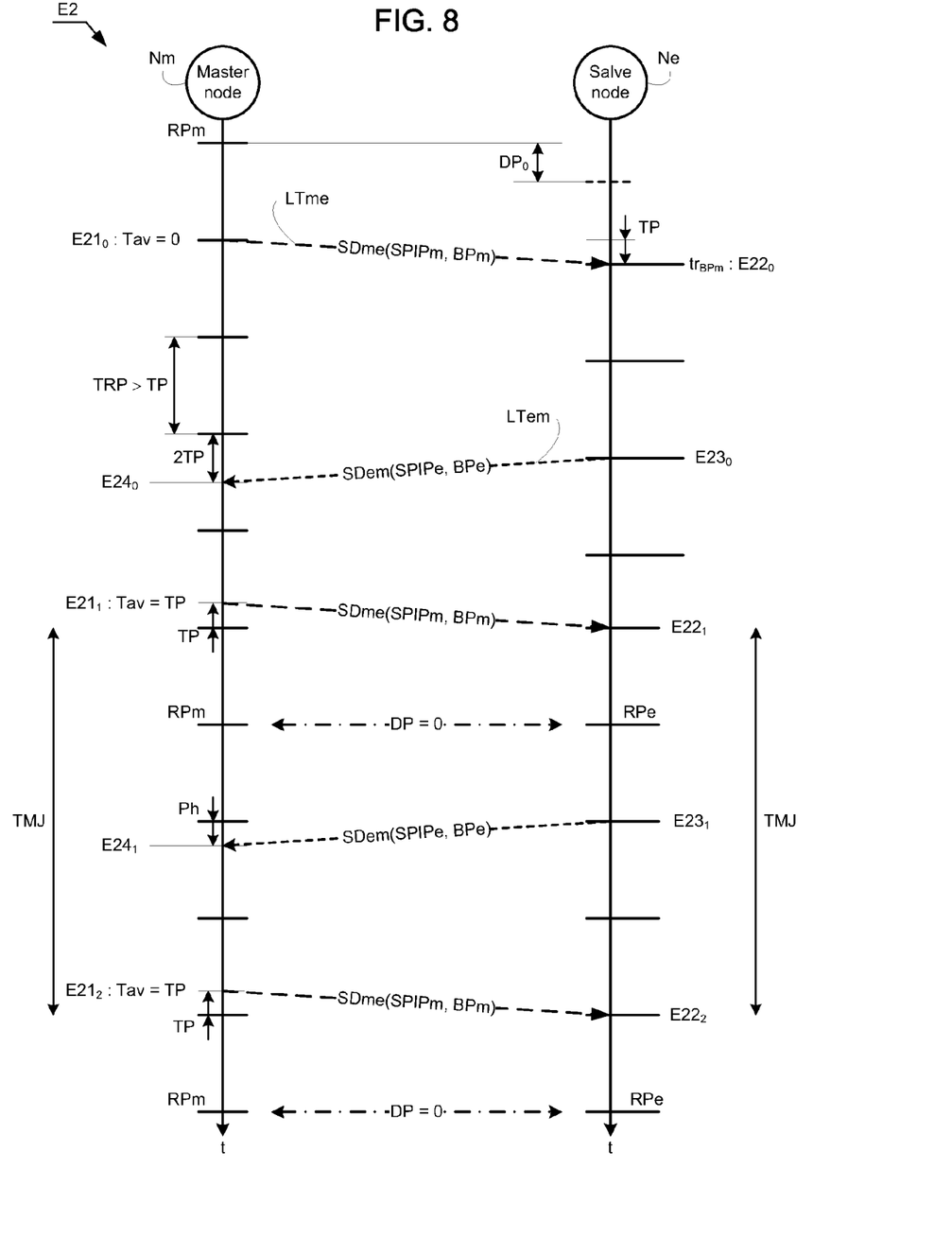
FIG. 8 is a time diagram of a phase information transfer time compensating step of the phase synchronizing method between a master node and a slave node, according to the invention.

Referring to FIG. 8, the step E2 for compensating the transfer time of the phase information includes a dialog between two neighboring nodes Nm and Ne made of initial steps $E21_0$ to $E24_0$, followed by iterative steps $E21_i$ to $E24_i$, with $i \geq 1$.

In the initial step $E21_0$, when the node Ne is a new slave node Ne that is to become slaved to the master node Nm, the phase synchronizer SPm of the master node Nm resets the advance time Tav. The interface ICm transmits a phase bit BPm introduced into the data signal SDme at the time of the internal phase reference RPm of the master node Nm on the transmission link LTme. Transmitting the phase bit BPm is accompanied with the transmission of the position signaling SPIPm for the position of the phase information BPm with respect to the bits of the data signal SDme carried by the link LTme, according to the steps E12 and E13 of the invention.

In step $E22_0$ in the slave node Ne, the interface ICe receives the phase bit BPm with a delay TP. The phase synchronizer SPe synchronizes the internal phase reference RPe in the time base BTe of the slave node Ne upon the reception time of the phase bit BPm, in dependence to the position signaling SPIPm for the position of the phase information BPm detected by the detector DETe. The internal phase reference RPe is thus delayed by TP with respect to that RPm of the master node Nm.

In step $E23_0$, the interface ICe of the slave node Ne responds to the master node Nm by transmitting a phase bit BPe in phase with a subsequent time of the synchronized phase reference RPe on the transmission link LTem. Transmitting the phase bit BPe does not necessarily occur at the synchronized phase reference time of the slave node Ne following the reception time of the phase bit BPm. The phase synchronizer SP of the slave node can indeed wait for a subsequent phase time, for example if the communication interface ICe in the slave node is not ready to send the phase bit BPe immediately at the first synchronized phase time RPe succeeding to the reception of the bit BFm. Transmitting the phase bit BPe is accompanied by transmission of the signaling SPIPe of the position of the phase information BPe with respect to the bits of the data signal SDem carried by the link LTem, by carrying out the steps E12 and E13 according to the invention but following the direction from the slave node Ne to the master node Nm.

In the step $E24_0$ in the master node Nm, the interface ICm receives the phase bit BPe from the slave node Ne with a delay of 2 TP on its internal phase reference RPm considering that the transfer time is identical in both directions of transmission on the links LTme and LTem. The detector DETm detects the position of the phase bit BPe in the signal SDem as a function of the received position signaling SPIPe. The phase synchronizer SPm derives the transfer time TP from the previously used value Tav=0 and the phase shift Ph between the received phase bit BPe and its internal phase reference RPm, i.e.:

$$(Tav+Ph)/2=(0+2TP)/2=TP.$$

The value Ph can sometimes be negative for example if the internal phase reference RPe of the slave node is for some reason too much in advance with respect to the internal phase reference RPm of the master node. The master node Nm updates the advance time Tav as follows from the old value of Tav:

$$Tav=(Ph+Tav)/c=(2TP+0)/c=TP, \text{ with } c \geq 2.$$

In a simple embodiment, the coefficient c is equal to 2 so as to immediately correct the phase reference RPe of the slave node Ne for again phasing it totally with the phase reference RPm of the master node and instantaneously in step $E21_1$ and in the following steps $E21_i$ of the following recurrences between nodes Nm et Ne. However, the coefficient c can be a decimal or integer number more than 2 so as to carry out more progressively and less suddenly the phasing step for the slave node Ne, as will be seen subsequently.

In step $E21_1$, the phase synchronizer SPm controls to the interface ICm the transmission of a phase bit BPm with the signaling SPIPm of its position generated by the module MPPm, in the signal SDme on the link LTme, in advance of Tav=TP with respect to the internal phase reference RPm.

In step $E22_1$ in the slave node Ne, the interface ICe receives the phase bit BPm with a delay TP and the detector DETe detects the position of the phase bit BPm in the signal SDme as a function of the received position signaling SPIPm. The phase synchronizer SPe updates the internal phase reference RPe by synchronizing the latter upon the reception time of the received bit BPm. The internal phase reference RPe is from now on in phase with the internal phase reference RPm of the master node Nm.

In step $E23_1$, the phase synchronizer SPe responds to the master node Nm by controlling again the interface ICe for the transmission of a phase bit BPe in phase with the new phase reference RPe and a signaling SPIPe of the position of this phase bit BPe generated by the module MPPe, in the signal SDem on the transmission link LTem.

In step $E24_1$ in the master node Nm, the interface ICm receives the phase bit BPe from the slave node Ne and the detector DETm detects as a function of the received position signaling SPIPe the position of the phase bit BPe delayed with respect to its internal phase reference RPm only by TP. The phase synchronizer SPm updates the advance time Tav:

$$Tav=(Tav+Ph)/2=(Tav+TP)/2=2TP/2=TP.$$

The value of the advance time Tav remains equal to TP as the transfer time has not changed since a phase bit BPm was previously sent.

Then, the phase information transfer time compensating step E2 is followed by other iterative steps $E21_2$ to $E24_2$ and, more generally, by steps $E21_i$ to $E24_i$ identical to the previous steps $E21_1$ to $E24_1$. In the course of steps $E21_i$ to $E24_i$, phase bits BPm synchronize in phase the phase reference RPe of the slave node, phase synchronized phase bits BPe are sent by the slave node Ne and are received with a delay TP by the master node Nm, and phase bits BPm are transmitted by the master node with an advance of TP with respect to its internal phase reference RPm.

By means of the systematic update of the value of the advance time Tav in the phase synchronizer SPm, any variation of the propagation time TP due for example to temperature variations in the links LTme and LTem is very quickly compensated by the method. Between updates of the internal phase reference RPe of the slave node Ne in steps $E22_i$, the internal phase reference RPe evolves at the rhythm of the oscillator OSCe internal to the slave node.

Iterative updates of the phase of a slave node Ne indicated by steps $E22_i$ in FIG. 8 occur at some period TMJ, for example, at the rhythm of once every second, when this is possible. According to the embodiment used for signaling the phase information such as the phase bit BP with the position signaling on SPIP, it happens that the phase bit is not able to be sent at each update period TMJ for example if useful data are transmitted at the same time. However, according to the first embodiment, sending a phase bit is always possible a priori by using a packet OAM and indicating by a position signaling SPIP where the phase is located, even if the packet has not been able to be sent strictly in phase.

It is nevertheless not necessary to send the phase each time, for example, every 4 phase references RPm of the master node, i.e. TMJ=4 TRP according to FIG. 8, or at larger periods, for example, every second. If the phase synchronizer SPe is not able to put in phase the phase reference RPe at a given time according to the binary clock signal Hbe for the link LTem, phasing occurs later. The internal phase reference RPe of the slave node Ne then evolves in dependence of the rhythm of the oscillator OSCe in the time base BTe. The target accuracy in the internal phase reference RPe depends on the quality of the rhythm of the oscillator OSCe internal to the slave node Ne and on the updating period of the phase reference RPe in the slave node.

The period TRP of the internal phase reference pulse RP delivered by the time bases BT in the nodes is much more than the transfer time TP of the phase information BP so as not to create any possible confusion in the calculation of the transfer time TP. Indeed, if the period TRP of the internal phase references RP of the nodes was of the same order, even less than the transfer time TP of the phase information, an error would occur in determining the transfer time, equal to some number of the period TRP, as the phase synchronizer SPm of the master node Nm would wrongly only refer to the last pulse of the internal phase reference RPm preceding the reception of the phase bit BPe, and not to the pulse of the internal phase reference RPm preceding a delayed time of the transfer time TP with respect to the emission of the phase bit BPe, to determine the transfer time. Such a situation no longer allows phasing the slave node Ne.

Taking an internal phase reference period TRP in nodes equal to a approximately one second, the above mentioned drawbacks are obviously overcome as the transfer times TP in links LT are much lower than one second.

As shown in FIG. 8, the phase synchronizer SPm in the master node Nm again determines and adjusts the advance time Tav systematically at each reception of a phase bit BPe transmitted from the slave node Ne, as a function of the previous advance time Tav and of the phase shift Ph between the received phase bit BPe and the internal phase reference RPm, i.e.:

$$Tav=(Tav+Ph)/c, \text{ with } c \geq 2.$$

In order to overcome disturbances in the course of some applications implemented in the slave nodes and based on the phase reference, due to a total re-phasing in steps $E22_0$ ad $E22_1$ by a sudden skip of the internal phase reference RPe in any slave node Ne, this invention proposes a re-phasing for the slave node Ne progressively rather than suddenly.

Phasing the phase reference RPe of the slave node Ne is progressively introduced with a predetermined value of the coefficient c more than 2. The phase shift between the master node Nm and the slave node Ne is then not instantaneously compensated for by the advance of the phase bit BPm sent by the master node Nm, but occurs gradually and according to plural sets of iterative exchange steps $E20_i$ and $E24_i$ between the two nodes. The higher the value selected for the coefficient c, i.e. the smaller the advances of the transmission $E21_i$ of the generated phase information BPm depending on fractions of the transfer time TP with respect to the phase reference RPm, the more phasing the slave node Ne is progressively and slowly readjusted. Similarly, the previous advance time Tav in the master node evolves slower and slower for reaching the value of the propagation time TP.

However, the coefficient c only "smoothes" a proportion of the initial phase shift $DP_0$ between the internal phase reference RPm of the master node Nm and that RPe of the slave node Ne correspondent to the transfer time in steps $E21_i$ and $E22_i$. But the coefficient c does not smooth the remainder of the phase shift that is immediately compensated for by the slave node Ne in the initial step $E22_0$, as the phase synchronizer SPe always synchronizes the phase reference RPe upon the reception time of the phase bit BPm transmitted by the master node Nm. Despite a coefficient c more than 2, for example ranging from 5 to 15, such a behavior can lead to an initial phase skip $DP_0$ of the internal phase reference of the slave node Ne in the initial step $E22_0$, as shown in FIG. 8.

Figure 9:
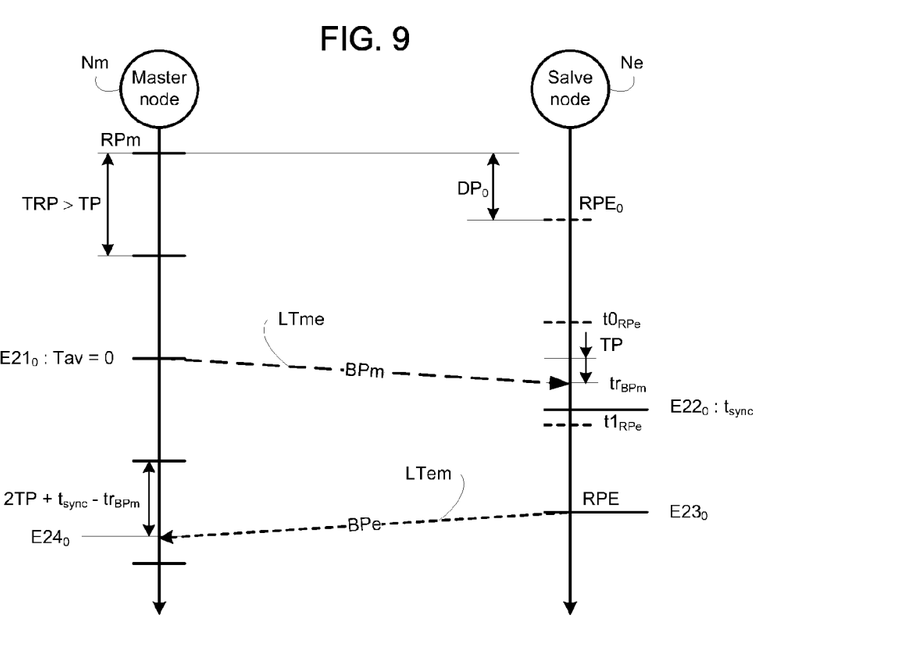
FIG. 9 is a time diagram of first steps at the beginning of the phase information transfer time compensating step, concerning an initial phase skip of a phase reference into the slave node.

In the slave node as shown in FIG. 9, for avoiding at least the initial phase skip $DP_0$ of the internal phase reference RPe, the phase synchronizer SPe does no longer synchronizes it directly with the reception time $tr_{BPm}$ of the phase bit BPm transmitted by the master node Nm in step $E21_0$, but slightly waits after the reception time $tr_{BPm}$ so as to delay the synchronization of the phase reference RPe by one time shift lying between the time $t0_{RPe}$ and the time $t0_{RPe}$ of the following initial phase reference $RPe_0$.

In step $E22_0$ in the slave node Ne, the phase synchronizer SPe defines a damping coefficient d characterizing the time shift, with $d \geq 1$. For example, the phase synchronizer SPe subtracts the reception time $tr_{BPm}$ of the phase bit BPm from the next time $t1_{RPe}$ of the initial phase reference RPe, divides the difference obtained by the coefficient d and delays from the quotient of the division the initial phase reference $RPe_0$ with respect to the following time $t1_{RPe}$ of the initial phase reference RPe, so as to determine the following time $t_{sync}$ on which the new phase reference RPe in the slave node Ne will be synchronized, i.e.:

$$t_{sync} = t1_{RPe} - (t1_{RPe} - tr_{BPm})/d, \text{ with } d \geq 1.$$

The case $d=1$ is illustrated in FIG. 8 where the internal phase reference RPe of the slave node Ne is synchronized directly on the reception time $tr_{BPm}$ of the phase bit BPm, leading to a phase skip $t1_{RPe} - tr_{BPm}$ as $t_{sync} = tr_{BPm}$. The higher the coefficient d, the slower the convergence of the phase reference RPe towards the phase reference RPm.

Instead that the difference $t1_{RPe} - tr_{BPm}$ be positive, the phase time can be selected as preceding the reception time $tr_{BPm}$ of the phase bit BPm, if the delay of the reception time $tr_{BPm}$ with respect to the previous phase time $t0_{RPe}$ is less than the advance of the reception time $tr_{BPm}$ with respect to the following phase time $t1_{RPe}$. In such a case, the internal phase reference of the slave node Ne is considered as being in advance. The difference $t0_{RPe} - tr_{BPm}$ is then negative, and the phase synchronizer SPe advances the internal phase reference of the slave node Ne with respect to the corresponding initial phase time $t0_{RPe}$ instead of delaying it.

By means of both coefficients c and d, the internal phase reference of the slave node Ne is progressively phased with that of the master node Nm, avoiding any too large phase skip.

Alternatively, for overcoming the drawbacks inherent to phase skips in the slave node Ne, only the communications for the phase information in the course of the dialog between the master node and the slave node are instantaneously phased in the slave node Ne, as in FIG. 8, i.e. $c=2$ and $d=1$. But the phase synchronizer SPe does not put instantaneously the internal phase reference RPe, and progressively slides the phase reference RPe in the time base BTe to a true phasing with the internal phase reference RPm. If the slave node Ne is also a master node for other slave nodes in the phase synchronization distribution network DSP, such an alternative avoids sudden phase skips, and the re-phasing in the slave node Ne actually occurs progressively, depending on the flexibility required by the application implemented in the slave node Ne and using the phase reference RPe, independently from the re-phasings in the other nodes of the network.

This invention herein described relates to a method for the phase synchronization of nodes, a node adapted to phase synchronize another node and a node adapted to be phase synchronized by another node in a telecommunications network. In an embodiment, the steps in the method of the invention are determined by instructions of a computer programs incorporated into processors of the nodes according to the invention. The program in a processor includes program instructions which, when said program is executed in the processor, whose operation is then controlled by executing the program, perform the steps in the method of the invention.

Consequently, the invention also applies to a computer program, including a computer program stored on or in a storage medium readable by a computer and any data processing device adapted to implement the invention. Such a program may be written in any programming language and take the form of source code, object code, or intermediate code between source code and object code, e.g. in a partially compiled form, or any other form suitable for implementing the method of the invention.

The storage medium may be any entity or device capable of storing the program. For example, the medium may comprise storage means on which the computer program of the invention is stored, such as a ROM, for example a CD-ROM or a microelectronic circuit ROM, or USB key, or magnetic storage means, for example a diskette (floppy disk) or hard disk.

Moreover, the information medium can be a transmissible medium such as an electrical or optical signal, which can be routed via an electrical or optical cable, by radio or by other means. The program according to the invention can in particular be downloaded over an Internet type network.

Alternatively, the storage medium may be an integrated circuit in which the program is incorporated, the circuit being adapted to execute or be used for the execution of the method embodying the invention.

The invention claimed is:

1. A method of phase synchronizing nodes linked by links of a telecommunications network, including:
   transferring from a first node to a second node phase information substantially in phase with a phase reference internal to said first node and a position signaling information which signals the position of said phase information with respect to component elements of a digital data signal carried from the first node to the second node by a link of the network linking said first node to said second node wherein said second node is to be synchronized with said first node, wherein said position signaling information precedes said phase information in said digital data signal.

2. A method of phase synchronizing nodes linked by links of a telecommunications network, including:
   transferring from a first node to a second node phase information substantially in phase with a phase reference internal to said first node and a position signaling information which signals the position of said phase information with respect to component elements of a data signal carried from the first node to the second node by a link of the network linking said first node to said second node wherein said second node is to be synchronized with said first node, wherein said position signaling information is a number of component element between said generated phase information and a bit having a predetermined rank in a predetermined packet of said data signal including said number.

3. A method of phase synchronizing nodes linked by links of a telecommunications network, including:
transferring from a first node to a second node phase information substantially in phase with a phase reference internal to said first node and a position signaling information which signals the position of said phase information with respect to component elements of a data signal carried from the first node to the second node by a link of the network linking said first node to said second node wherein said second node is to be synchronized with said first node, wherein said position signaling information is a managing code word that is generated with a predetermined phase shift with respect to said phase reference internal to said first node and in which said phase information is positioned in a predetermined rank.

4. A method of phase synchronizing nodes linked by links of a telecommunications network, including:
transferring from a first node to a second node phase information substantially in phase with a phase reference internal to said first node and a position signaling information which signals the position of said phase information with respect to component elements of a data signal carried from the first node to the second node by a link of the network linking said first node to said second node wherein said second node is to be synchronized with said first node, wherein said position signaling information is a specific modulation in said generated phase information.

5. A method according to claim 1, wherein said transferred position signaling information is completed by a residual information specifying a time interval between said phase information and a time of said phase reference internal to said first node, said time interval being less than a period of said component elements in said digital data signal.

6. A method according to claim 1, including in said first node memorizing a cumulated residual time interval between said phase information and said phase reference internal to said first node, and time shifting said phase information one component element in said data signal if the memorized cumulated residual time interval exceeds a period of said component elements in said digital data signal.

7. A method according to claim 1, including compensating a transfer time of said phase information through said link linking said first node to said second node.

8. A method according to claim 7, wherein compensating said transfer time includes iteratively:
from said first node to said second node, transmitting said phase information in said first node with a time shift depending on said transfer time with respect to said phase reference internal to said first node and said position signaling information of said phase information to said second node,
in said second node, synchronizing a phase reference internal to said second node with receipt of said phase information transmitted by said first node and detected as a function of said position signaling information,
transmitting said from said second node to said first node another phase information said substantially in phase with the synchronized phase reference internal to said second node and a position signaling information of said other phase information with respect to said component elements of a data signal carried by a link linking said second node to said first node, and
upon receipt of said other phase information in said first node, updating said time shift with respect to said phase reference internal to said first node as a function of the previous time shift and of a phase shift between said phase reference internal to said a first node and said other phase information detected as a function of said position signaling information of said other phase information.

9. A method according to claim 8, wherein said phase reference internal to said second node is phased progressively by time shifts of the transmission of the phase information in said first node depending on fractions of said transfer time with respect to said phase reference internal to said first node.

10. A method according to claim 8, including progressively phasing said phase reference of said second node by:
subtracting a receipt time of said phase information transmitted by said first node from a time close to an initial phase reference said of said second node to provide a difference,
dividing said difference by a coefficient more than 1 to provide a quotient, and
phasing said initial phase reference from said quotient with respect to said close time.

11. A node adapted to phase synchronize another node and configured to be linked thereto by a link in a telecommunications network, the node comprising:
a phase information positioning module; and
a phase synchronizer communicatively coupled with the phase information positioning module, wherein the phase information positioning module is configured to generate, responsive to the phase synchronizer, a phase information and a position signaling information which signals the position of said phase information with respect to component elements of a digital data signal transmitted by said link from said node to said another node wherein said phase information positioning module is configured to generate said position signaling information such that said position signaling information precedes said phase information in said digital data signal.

12. A node according to claim 11, wherein said phase synchronizer comprises:
means for transmitting to said another node said phase information with a time shift depending on a transfer time of said phase information through said link with respect to said phase reference internal to said first node and said position signaling information of said phase information, and
means for updating the time shift with respect to said phase reference internal to said node as a function of the previous time shift and of a phase shift between said phase reference internal to said node and a phase information transmitted by said another node and detected as a function of a position signaling information transmitted by said another node, said position signaling information indicating the position of said phase information transmitted by said another node with respect to said component elements of a data signal carried by said link from said node to said another node.

13. A node adapted to be phase synchronized by another node and configured to be linked thereto by a link in a telecommunications network, the node comprising:
a detector; and
a phase synchronizer communicatively coupled with the detector, wherein the phase synchronizer is configured to phase synchronize a phase reference with receipt of a phase information and detected as a function of a position signaling information of said phase information with respect to component elements of a digital data signal transmitted by said another node on said link wherein said position signaling information precedes said phase information in said digital data signal.

14. A node according to claim 13, wherein said phase synchronizer comprises:

means for transmitting to said another node a phase information substantially in phase with the synchronized phase reference internal to said node, and means for transmitting a position signaling information of the phase information to be transmitted with respect to component elements of a data signal carried by the link to said another node so as to update a time shift of the transmission of said phase information from said another node with respect to said phase reference internal to said node.

15. A non-transitory computer-readable storage medium or a computer-readable device storing a program for causing a data processor arrangement in a first node to phase synchronize a second node and linked to said first node by a link in a telecommunications network, said program including program instructions which, when the program is executed in said processor arrangement of said first node, cause the processor to:

perform transferring to said second node a phase information substantially in phase with a phase reference internal to said first node and a position signaling information of said phase information with respect to component elements of a digital data signal transmitted by said link to said second node wherein said position signaling information precedes said phase information in said digital data signal.

16. A non-transitory computer-readable storage medium or a computer-readable device storing a program for causing a data processor arrangement in a first node adapted to be phase synchronized by a second node and linked to said first node by a link in a telecommunications network, said program including program instructions which, when the program is executed in said processor arrangement of said first node, cause the processor to:

perform phase synchronizing a phase reference with receipt of a phase information substantially in phase with a phase reference transferred by said second node and detected as a function of a position signaling information of said phase information with respect to component elements of a digital data signal transmitted by said second node on said link wherein said position signaling information precedes said phase information in said digital data signal.

17. A non-transitory digital data signal adapted to be carried by a link between two nodes of a telecommunications network to be phase synchronized, including:

phase information substantially in phase with a phase reference internal to one of said nodes, and a position signaling information of said phase information with respect to component elements of said digital data signal wherein said position signaling information precedes said phase information in said digital data signal.

18. The node according to claim 11, wherein the phase information is substantially in phase with a phase reference internal to said node.

19. The node according to claim 13, wherein the phase information is substantially in phase with a phase reference transferred by said another node.

* * * * *

UNITED STATES PATENT AND TRADEMARK OFFICE
CERTIFICATE OF CORRECTION

PATENT NO. : 9,143,251 B2
APPLICATION NO. : 12/601089
DATED : September 22, 2015
INVENTOR(S) : Jobert et al.

Page 1 of 1

It is certified that error appears in the above-identified patent and that said Letters Patent is hereby corrected as shown below:

Title Page

In column 1 (page 1, item 86) at line 1, Change "PCT/FR2008/050875" to --PCT/FR2008/050872--.

Signed and Sealed this
Nineteenth Day of April, 2016

Michelle K. Lee
*Director of the United States Patent and Trademark Office*